Feb. 16, 1971 J. J. A. JONKERS 3,563,737
METHOD OF MANUFACTURING A PLURALITY OF RELATIVELY MATCHED
MASKS USED IN THE PRODUCTION OF PHOSPHOR SCREENS
Filed Sept. 6, 1967 4 Sheets-Sheet 1

INVENTOR.
JOHANNES J. A. JONKERS

BY

*Frank R. Trifari*
AGENT

Feb. 16, 1971  J. J. A. JONKERS  3,563,737
METHOD OF MANUFACTURING A PLURALITY OF RELATIVELY MATCHED
MASKS USED IN THE PRODUCTION OF PHOSPHOR SCREENS
Filed Sept. 6, 1967  4 Sheets-Sheet 2

INVENTOR.
JOHANNES J.A. JONKERS

BY

AGENT

United States Patent Office 3,563,737
Patented Feb. 16, 1971

3,563,737
METHOD OF MANUFACTURING A PLURALITY OF RELATIVELY MATCHED MASKS USED IN THE PRODUCTION OF PHOSPHOR SCREENS
Johannes Josephus Antonius Jonkers, Emmasingel, Eindhoven, Netherlands, assignor, by mesne assignments, to U.S. Philips Corporation, New York, N.Y., a corporation of Delaware
Filed Sept. 6, 1967, Ser. No. 665,898
Claims priority, application Netherlands, Sept. 13, 1966, 6612852
Int. Cl. G03c 5/04
U.S. Cl. 96—27                                        3 Claims

ABSTRACT OF THE DISCLOSURE

A method of making matched masks each consisting of a glass carrier provided with portions previous to radiation which are used in the manufacture of a luminescent display screen for a cathode ray tube for color display. This screen comprises at least two sets of striplike surfaces which luminesce under electron impact with different colors and are separated by nonluminescing light impervious strips and strips which produce an index signal upon electron excitation. These masks are manufactured by first exposing a photosensitive layer through an auxiliary mask to form a negative corresponding to one set of strips and repeating this procedure to form a negative for each set of strips and thereafter exposing a photosensitive layer through one of the negatives to form a mask corresponding to one set of strips and repeating the procedure to form a mask for each set of strips.

---

This invention relates to a method of manufacturing a plurality of relatively matched masks each consisting of a glass carrier provided with portions impervious to radiation, which masks are used in the manufacture of a display screen for a cathode-ray tube for colour display, said screen comprising at least two substances present in substantially striplike surfaces, which become luminescent in different colours upon excitation by electrons and are separated by substantially striplike surfaces of a substance which does not become luminescent in visible light upon electron excitation and is impervious to light, and substantially striplight surfaces of a substance which produces an index signal upon electron excitation.

The various surfaces of the display screen are manufactured by using a photosensitive binding agent, that is a substance which no longer dissolves in a certain solvent, after having been exposed to so-called "hardening radiation," the use of a mask always causing those portions to be irradiated where the relevant substance must be present. The desired distribution of the substantially striplike surfaces is, for example, obtained by using a punctiform radiation source and applying between this source and the layer to be exposed a mask having portions pervious to the radiation so that the desired surfaces are exposed. In this case of contact or dimming exposure the mask is placed close to the carrier of the photosensitive binding agent. This carrier is usually the window of the cathode-ray tube and the shape of the mask must then correspond to the curved inner surface of the window. Another possibility for obtaining the desired distribution is to produce an image of an illuminated, usually flat mask on the layer to be exposed with the aid of a system of lenses.

The display screen of the kind described usually comprises three substances which, upon electron excitation, become luminescent in different colours, namely red, green and blue. The substantially striplike surfaces of the substance which produces an index signal upon electron excitation (which will further simply be called "index strips") must occupy the positions of a part of the surfaces of the substance which does not become luminescent in visible light upon electron excitation and is impervious to light (which will further simply be called "intermediate strips"). This is to be understood to mean the following. The display screen includes a metal layer pervious to electrons, which is present on the luminescent strips and the intermediate strips, and the index strips are present on this metal layer, the index strips being situated on the other side of the metal layer pervious to electrons than a portion of the intermediate strips. As regards the widths of the various strips on the display screen each luminescent strip must completely fill up the space between the adjacent intermediate strips. Since in the manufacture of the display screen first the intermediate strips and then the lumnescent strips are applied, while the intermediate strips do not pass light, the luminescent strips may also extend in part behind the intermediate strips, as viewed from the window. In practice this is actually the case in order to ensure that the interspace is actually filled up by the luminescent strip. Each luminescent strip is therefore preferably somewhat broader than the relevant interspace. The width of the index strips is at most equal to that of the intermediate strips. If the index strips were broader the electron current would not be able to reach, or at least not with sufficient energy, a portion of the luminescent strips. The width of the index strips may, however, be smaller if it is ensured that sufficient substance is present to produce the desired signal.

On account of the structure of the display screen the masks which are used when exposing the different binder layers must be accurately matched to one another. In connection with the electron optical system of the cathode-ray tube, for which it is mostly desirable that the luminescent strips are, at certain areas, somewhat curved instead of straight and that the width of the luminescent strips is not the same throughout, which then of course applies also to the intermediate strips and the index strips, the display screen has a strip structure which is not particularly simple. The matched masks must thus have a corresponding complicated structure. During exposure the masks must further always assume very definite positions relative to the window and the lens system, if any. In each case, when applying the luminescent strips and the index strips, the relevant substance is usually suspended in a solution of the photosentive binding agent. This suspension is spread on the carrier, which in these cases is the inner side of the window on which the intermediate strips and possibly also luminescent strips are already present, then dried and subsequently subjected to the influence of hardening radiation in the exposure setup. With bulk manufacture it may be preferable for technical reasons in manufacture to use a separate exposure setup for each substance to be applied. If it is ensured that the position of the mask relative to the window and the possible lens system is the same in each exposure setup very high requirements are still imposed upon the matched condition of the different masks in order that the display screen actually acquires the desired structure. The present invention provides a comparatively simple method of manufacturing such matched masks.

According to the invention a negative consisting of a carrier provided with portions impervious to radiation is first manufactured for each mask in the same exposure setup using a photosensitive layer with the radiation passing through an auxiliary mask in the case of the negative for the mask relating to the substantially striplike surfaces of the substance which does not become luminescent in visible light upon electron excitation and is impervious to light, and the radiation passing through the partly covered auxliary mask in the cases of the negatives for the masks relating to the substantially striplike surfaces of the substances which become luminescent in different colours upon electron excitation and to the substantially striplike surfaces of the substance which produces an index signal upon electron excitation, whereafter a mask of each negative is manufactured, using a photosensitive layer.

With regard to the negatives of the masks for the luminescent strips the covering of the auxiliary mask is adapted to the number of luminescent substances to be applied. If these masks relating to luminescent strips must be manufactured because the display screen contains three luminescent substances, then two of three successive portions of the auxiliary mask pervious to the radiation are covered in the manufacture of the relevant negatives. This may, for example, be effected with the use of an additional auxiliary mask. In said additional auxiliary mask the portions pervious to the radiation need not be formed with great accuracy since it is sufficient for the additional auxiliary mask to be so designed that on the one hand only such radiation is transmitted as passes one of the binder layer which are present at least between to the radiation and on the other hand no part of this radiation is checked. An analogous reasoning applies of course in the case of other number of masks corresponding to the luminescent substances. A corresponding reasoning applies to the covering of the auxiliary mask with regard to the negative of the mask for the index strips. In a certain case the index strips of the display screen, apart from a comparatively narrow strip which is substantially parallel to the edge of the effective display screen, are present at the areas of every other intermediate strip. The additional auxiliary mask, which is used in the manufacture of the relevant negative, is matched to this situation. In this case, too, high requirements of accuracy need not be imposed on the additional auxiliary mask.

Since in the display screen the index strips occupy the positions of the part of the intermediate strips the auxiliary mask may occupy a position relative to the plate to be exposed and possibly the lens system which is the same during the exposure for the negative of the mask for the index strips as during the exposure for the negative of the mask for the intermediate strips. In the display screen the luminescent strips are situated in the interspaces between the intermediate strips and in the manufacture of the display screen the hardening radiation for luminescent strips must thus harden exactly those areas of the binder layer which are present at least between the existing intermediate strips on the window. This distinction may be met in various manners. It is possible to provide for this in the manufacture of the display screen in the exposure setup relating to the luminescent substances by adjusting the position of the window relative to the mask. Then it is not necessary to take special steps in the manufacture of the masks. It is also possible to provide for this in the manufacture of the masks and then either in the manufacture of the relevant negatives or during the step when a mask is made from a negative. If the matching is effected during the manufacture of the negatives this can be done in various ways. It is possible for the plate on which the negative will be formed to be displaced relative to the auxiliary mask over a distance which is equal to the distance between the centers of an intermediate strip and an adjacent interspace. It is also possible to move the auxiliary mask over this distance. If, however, an image of the exposed auxiliary mask is produced with the aid of a lens system, it is possible to bring about an aptical displacement with the setup remaining mechanically unchanged, which is of course preferred. To this end, use is made of a planoparallel glass or quartz plate which is parallel to the auxiliary mask during the exposure for the negatives of the masks for the intermediate strips and the index strips but is turned through a small angle on an axis parallel to the line pervious to radiation, in the middle of the auxiliary mask during the exposure of the negatives of the masks for the luminescent strips. The thickness of the plate and the angle through which it is turned are dependent on the desired displacements at the areas of the negatives. Preferably in the manufacture of the negatives the radiation therefore always passes through a planoparallel plate which occupies the same position in the case of the negative for the mask relating to the substantially striplike surfaces of the substance which does not become luminescent in visible light upon election excitation and is impervious to light and in the case of the negative for the mask relating to the substantially striplike surfaces of the substance which produces an index signal upon electron excitation, and which plate in turned relative to that position through a small angle about an axis parallel to the line pervious to the radiation, in the middle of the auxiliary mask in the cases of the negatives for the masks relating to the substantially striplike surfaces of the substances which become luminescent in different colours upon election excitation. If the matching is effected during the step when a mask is made from a negative then it is possible for the plate on which the mask will be formed to be displaced relative to the negative over a distance corresponding to the distance between the centers of an intermediate strip and an adjacent interspace in the relevant negative. If an image of the illuminated negative is produced with the aid of a lens system then also an optical displacement is possible, using a planoparallel glass or quartz plate.

After the manufacture of the negative of the mask for the luminescent strips of the first colour the setup must be modified for the manufacture of the negatives of the masks for the next colours, in order that the portions of said masks pervious to radiation are shifted relative to those of the mask for the luminescent strips of the first colour. This can be effected by displacing the plate on which the negative will be formed relative to the auxiliary mask and the additional auxiliary mask. It is, however, preferred not to change the position of the plate on which the negative will be formed, since at the next step when the mask is made of each negative the arrangement of the negative relative to the light source and the plate on which the mask will be formed can then be equal in each of these cases. There are then still two possibilities. In the one case the additional auxiliary mask is displaced relative to the auxiliary mask in such manner that the hardening radiation passes through portions of the auxiliary mask which were covered by the additional auxiliary mask in the preceding case or in the preceding cases. In the other case a separate additional auxiliary mask is present for the manufacture of the negative for the strips of each luminescent substance.

In the cases described here, always the same exposure procedure is applied in the manufacture of the negatives and the masks, namely either a so-called negative procedure in both cases or a so-called positive procedure in both cases.

In a negative procedure the exposed portions are impervious to radiation. This can be realized in various manners and some examples will be explained hereinafter. In the first case the carrier is covered with a photographic layer which normally is developed after selective exposure. On the exposed portions silver nuclei are produced which are intensified and grow. In the second case the carrier is covered with a photosensitive negative lacquer layer, that is to say, a lacquer, for example, polyvinyl alcohol with bichromate or albumen with bichromate, which becomes insoluble upon exposure. After selective exposure and dissolution of the unexposed portions the exposed lacquer is slightly coloured with suitable colouring matter or pulverulent dark particles are adhered thereto. In the third case a well-adhering metal layer is vapour-deposited on the carrier, for example, a chromium layer or a chromium-nickel layer. During vapour-deposition the carrier is preferably heated. The metal layer is covered with a photosensitive negative lacquer layer. After selective exposure and dissolution of the unexposed portions the isolated metal is etched away. In the fourth case either the carrier is covered with a photosensitive positive lacquer layer, that is to say, a lacquer which becomes soluble upon exposure (for example "Kalle P"-lacquer), which is exposed selectively, after which the exposed portions are washed away, or the carrier is covered with a photographic layer whereupon a reversing development is applied after selective exposure, the silver picture formed after development being dissolved and subsequently the remaining portions of the photographic layer being re-exposed and developed. In these manners a partly covered carrier is obtained upon which metal, for example, chromium or chromium-nickel is vapour-deposited. The metal adheres better to the carrier itself than to the remaining lacquer or photographic layer. The residual lacquer or photographic layer is removed with a suitable solvent so that the metal present thereon is also removed.

In a positive procedure the unexposed portions are impervious to radiation. Strictly speaking, the product obtained by such a procedure cannot be called a "negative." For the sake of simplicity the object which is manufactured starting from the auxiliary mask, possibly covered in part, and of which the mask is manufactured, is referred to as the negative in the specification and claims. This concept should thus be given a wider significance than corresponds to the strict significance. A positive procedure can also be realized in various manners and some examples will be explained hereinafter. In the first case the carrier is covered with a photographic layer upon which a reversing development is used after selective exposure. The silver picture formed after development is dissolved and the remaining portion of the photographic layer is re-exposed and developed. In the second case the carrier is covered with a photosensitive positive lacquer layer, that is to say, a lacquer upon exposure becomes soluble in a certain solvent, for example, "Kalle P"-lacquer, in which the exposed lacquer is insoluble. After selective exposure and dissolution of the exposed portions the unexposed lacquer is slightly coloured with suitable colouring matter, or pulverulent dark particles which adhere thereto. In the third case a well-adhering metal layer, for example, a chromium or a chromium-nickel layer, is vapour-deposited on the carrier. During vapour-deposition the carrier is preferably heated. The metal layer is covered with a photosensitive positive lacquer layer. After selective exposure and dissolution of the exposed portions the isolated metal is etched away. In the fourth case either the carrier is covered with a photosensitive negative lacquer layer (for example, a polyvinyl alcohol with bichromate or albumen with bichromate), which is selectively exposed, after which the unexposed portions are washed away, or the carrier is covered with a photographic layer which, normally is developed after selective exposure. In these manners a partly covered carrier is obtained upon which metal, for example, chromium or chromium-nickel is vapour-deposited. The metal adheres better to the carrier itself than to the remaining lacquer or photographic layer. The residual lacquer or photographic layer is removed with a suitable solvent so that the metal present thereon is also removed.

In general negatives and masks having impervious portions consisting of chromium or chromium-nickel are favourable because they are then not so vulnerable and can easily be cleaned. This is of course more particularly important for the masks since these are used in the manufacture of a large number of display screens.

If a negative procedure or a positive procedure is not always used in the manufacture of the negatives and the masks, this can be met in a special way by matching the masks relatively to one another in such manner that in the manufacture of the display screen the radiation for hardening the luminescent strips hardens portions of the binder layer which are present at least between the existing intermediate strips on the window. This will be further explained hereinafter. In the manufacture of the masks for the intermediate strips either the negative is manufactured according to a negative procedure and then the mask according to a positive procedure, or the negative is manufactured according to a positive procedure and then the mask according to a negative procedure.

The pervious portions of the mask thus correspond to the impervious portions of the auxiliary mask. In the manufacture of the masks for the luminescence strips the negative and the masks are either manufactured according to a negative procedure or according to a positive procedure. The pervious portions of these masks thus correspond to pervious portions of the auxiliary mask so that the desired shift is realized. A special provision should be made in the manufacture of the mask for the index strips the pervious portions of which should correspond to the pervious portions of the mask for the intermediate strips and hence in this case correspond to impervious portions of the auxiliary mask. In the manufacture of the negative selective exposure is effected twice. The first time the radiation passes the uncovered axiliary mask and the second time the radiation passes the auxiliary mask covered with the relevant additional auxiliary mask and also a planoparallel glass or quartz plate which is set up in such manner that an optical shift is obtained through a distance which is approximately equal to the distance between the centres of a still unexposed portion of the negative and of an adjacent already exposed portion of the negative. In the second exposure a portion of the still unexposed portions is thus exposed, dependent on the shape of the additional auxiliary mask. As previously mentioned, the portions pervious to the radiation need not be formed in the additional auxiliary mask with high accuracy since it is sufficient that on the one hand only radiation is transmitted which passes certain pervious portions of the auxiliary mask and on the other hand no portion of this radiation is checked. Also for the optical shift obtained with the aid of the planoparallel glass or quartz plate no high accuracy is required in this case for which an analogous reasoning applies. If the negative is manufactured according to a negative procedure, then a mask is manufactured of the negative with the aid of a positive procedure. If the negative is manufactured according to a positive procedure then a mask is manufactured of the negative with the aid of a negative procedure. Therefore, more particularly in the manufacture of the negative for the mask relating to the substantially striplike surfaces of the substance which does not become luminescent in visible light upon electron excitation and is impervious to light and in the manufacture of this mask such photo-sensitive layers are used that the pervious portions of the mask correspond to impervious portions of the auxiliary mask. In the manufacture of the negatives for the masks relating to the substantially striplike surfaces of the substances which become luminescent in different colours upon electron excitation and in the manufacture of these masks such photosensitive layers are used that the pervious portions of the mask correspond to pervious portions of the auxiliary mask. In the manufacture of the negative for the mask relating to the substantially striplike surfaces of the substance which produces an index signal upon electron excitation the photosensitive layer is exposed twice, namely the radiation passes the first time the uncovered auxiliary mask and the second time the partly covered auxiliary mask, and this in such manner that the unexposed portions of the negative correspond to part of the impervious portions of the auxiliary mask, while in the manufacture of the negative and the mask such photosensitive layers are used that the pervious portions of the mask correspond to the unexposed portions of the negative.

The negatives are preferably curved and this in the same manner as the window of the cathode-ray tube, the portions impervious to radiation being situated on the same side as the strips to be applied later on the window. When reproducing from flat on to concave/convex or from concave/convex on to flat a specially adapted system of lenses is preferably used.

Since in the display screen the luminescent strips may and will usually be situated partly behind the intermediate strips, the portions pervious to radiation of the mask which is used in applying the intermediate strips are decisive for the position, the shape and the width of the intermediate strips and the portions impervious to radiation of the said mask are decisive for the position the shape and the width of the portions of the luminescent strips which contact the window of the cathode-ray tube. This must be taken into account in the manufacture of the masks. The width of the hardened portions of each binder layer when using the masks during the manufacture of the display screen is determined not only by the portions pervious to radiation of the mask but also by the manner in which the substance is applied, namely whether the substance is suspended in a solution of the photosensitive binding agent or only the binder layer is exposed and the substance to be applied is adhered in a later step to the portions which have become sticky, said width further being determined although to a lesser degree, by the exposure time. If the substance to be applied is suspended in a solution of the photosensitive binding agent the particles of the substance cause a certain dispersion of the hardening radiation, resulting in the hardened portions of the binder layer being broadened in comparison with the case where the substance is not suspended in the solution. The influence of the exposure time is greater if with the aid of a lens system an image of the illuminated mask is produced on the layer to be exposed on the display screen to be manufactured than in the case where in the arrangement the mask lies close to the binder layer. If the illuminated mask is reproduced on the layer to be exposed with the aid of a lens system and if the portions of the mask pervious to radiation are as wide as the portions impervious to radiation then, in case the substance to be applied has been suspended in the solution of the photosensitive binding agent, the exposed portions of the binder layer are always wider than the unexposed portions; how much wider depends upon the time of exposure. If the substance to be applied is not suspended in the solution the exposure portions of the binder layer are usually somewhat wider than the unexposed portions; by suitable choice of the exposure time they can be equally wide and possibly even somewhat narrower. The binding agent becomes insoluble at the exposed areas but, if the exposure is at least not continued too long, it becomes somewhat sticky as soon as it is moistened with a solvent. If, however, a longer exposure time must be used to obtain the desired width, then a thicker binder layer will have to be used. These considerations which apply to the manufacture of the display screen, using the masks manufactured by the method according to the invention, must be taken into account in manufacturing the masks and this may, among other things, find expression in the ratio between the widths of the previous portions and the impervious portions of the auxiliary mask.

The invention will now be described with reference to the accompanying drawing in which several setups are shown in cross section and not to scale.

Figure 1:
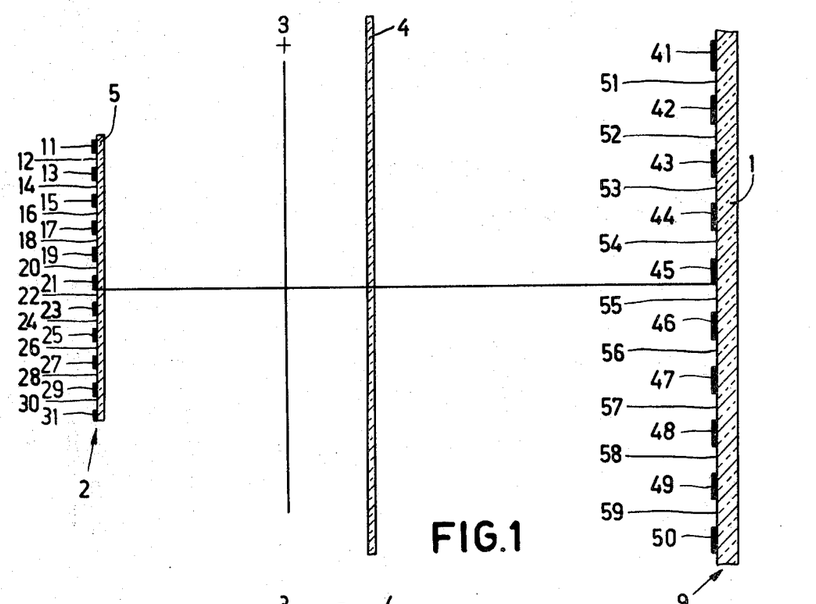
FIG. 1 relates to the manufacture of the negative for the intermediate strips.

Referring now to FIG. 1, this figure shows a part 1 of a curved glass plate, a flat auxiliary mask 2 which is exposed to a radiation source (not shown), a lens system 3 (shown diagrammatically) with the aid of which the illuminated auxiliary mask is reproduced on the layer to be exposed on the glass plate, and a planoparallel glass plate 4 of 1 cm. thick is pervious to the radiation. The surface of the glass plate 1 facing the lens corresponds substantially to the surface of the window of the cathode-ray tube to which the display screen is applied. Since the illuminated flat auxiliary mask 2 is reproduced on the layer to be exposed on the curved glass plate 1, the lens system 3 must preferably satisfy particular requirements. The auxiliary mask 2 consists of a glass plate 5 having thereon substantially striplike surfaces 11, 13, 15, 17, 19, 21, 23, 25, 27, 29 and 31 which are impervious to the radiation. Said surfaces each have a width slightly more than 37 microns in the middle of the auxiliary mask. During the reproduction the portions pervious to radiation 12 14, 16, 18, 20, 22, 24, 26, 28 and 30, which are slightly less than 37 microns wide in the middle of the auxiliary mask, serve as the object. The side of the glass plate 1 facing the lens is provided with a photosensitive layer which is exposed according to the setup shown in FIG. 1, the radiation source (not shown), the auxiliary mask 2 and the lens system 3 being rigidly arranged relative to one another and the plate 1 occupying an accurate position relative hereto. For the sake of simplicity, only the picture produced of the photosensitive layer is shown consisting of the portions 41, 42, 43, 44, 45, 46, 47, 48, 49 and 50. It will be evident, however that the plate 1 with said portions is obtained only after development of the partly exposed layer which operation is of course effected outside the exposure setup, so that in fact the figure does not show a stage of the method. The radiation passes through the planoparallel glass plate 4 which is placed parallel to the auxiliary mask 2. Optically, the setup is such that a magnification of 200/37 occurs. In the resulting negative 9 for the intermediate strips the portions (41 up to and including 50) are impervious to the radiation which is used later in the manufacture of the relevant mask with the aid of said negative. The portions (41 up to and including 50) are each slightly less than 200 microns wide in the middle of the negative, whereas the intermediate uncovered portions 51, 52, 53, 54, 55, 56, 57, 58 and 59 have in situ a width slightly more than 200 microns.

Figure 2:
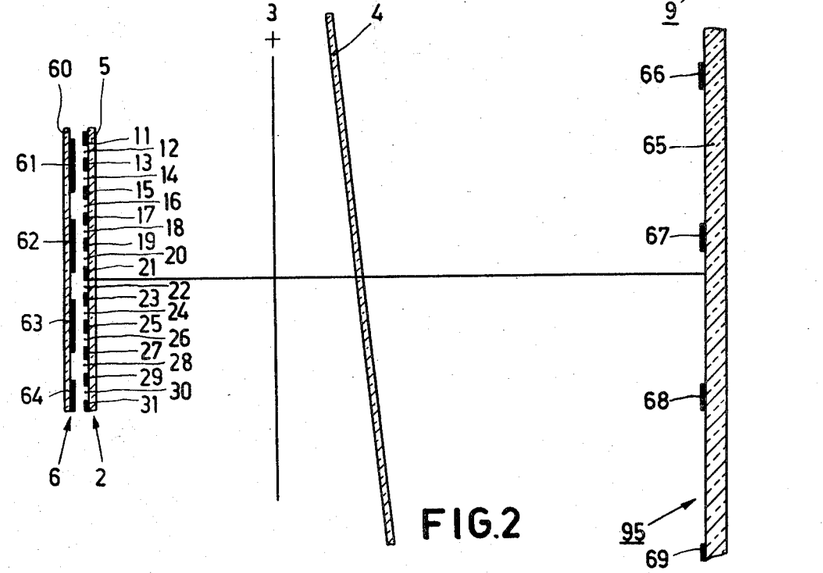
FIG. 2 to the manufacture of the negative for the strips of the first phosphor.

In FIG. 2, 65 indicates a part of a curved glass plate which occupies the same accurate position relative to the radiation source (not shown), the auxiliary mask 2 and the lens system 3 as the glass plate 1 in FIG. 1, while the surface area facing the lens is also substantially the same. The side of the glass plate 65 facing the lens is provided with a photosensitive layer which is exposed according to the setup shown in FIG. 2. For the sake of simplicity, only the picture produced of the photosensitive layer is shown, consisting of the portions 66, 67, 68 and 69. An additional auxiliary mask 6 is placed at the side of the auxiliary mask 2 facing the radiation source (not shown). The additional auxiliary mask 6 consists of a glass plate 60 having thereon substantially striplike surfaces 61, 62, 63 and 64 which are impervious to the radiation. The surface 61 ensures that the radiation cannot reach the pervious portions 12 and 14 of the auxiliary mask 2; the same applies to the surface 62 relative to the portions 18 and 20, to the surface 63 relative to the portions 24 and 26, and to the surface 64 relative to the portion 30. On the other hand, the additional auxiliary mask 6 allows the radiation which is directed to the pervious portions 16, 22 and 28 of the auxiliary mask 2 to pass unhampered. During the reproduction which takes place with the setup of FIG. 2 the portions 16, 22 and 28 pervious to radiation serve as the object. The planoparallel plate 4 is turned through an angle of 3° 10′ with respect to the position shown in FIG. 1 in order to ensure that in a corresponding setup of the glass plates 1 and 65 relative to the radiation source (not shown), the auxiliary mask 2 and the lens system 3, the picture formed on the plate 65 compared to that formed on the plate 1 is shifted over a distance which is equal to the distance between the centers of the strip 45 and the uncovered portion 55. In the resulting negative 95 for the strips of the first phosphor the portions 66, 67, 68 and 69 are impervious to the radiation which is used later in the manufacture of the relevant mask with the aid of the said negative. The portions 66, 67, 68 and 69 have a width slightly less than 200 microns in the middle of the negative.

Figure 3:
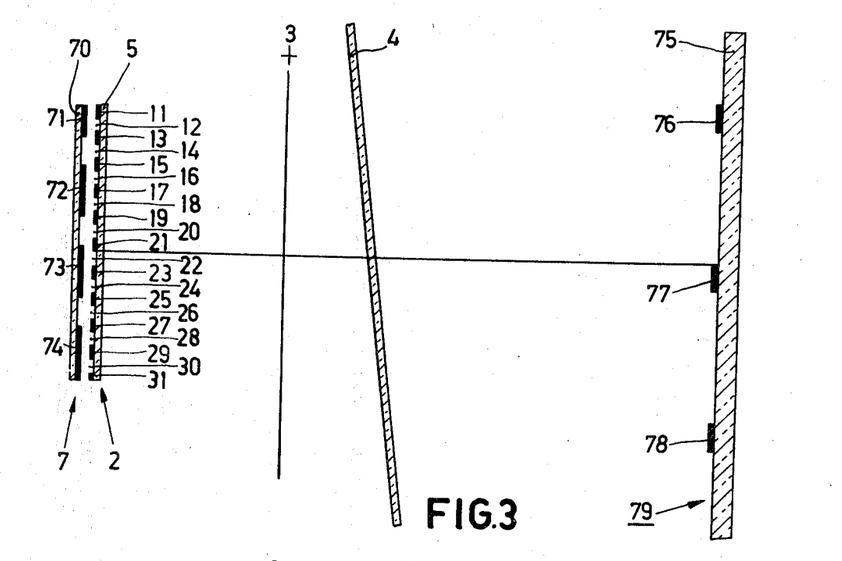
FIG. 3 to the manufacture of the negative for the strips of the second phosphor, FIG. 4 to the manufacture of the negative for the index strips, FIG. 5 to the manufacture of the mask for the intermediate strips, FIG. 6 also to the manufacture of the mask for the intermediate strips, FIG. 7a to a connection with the mask for the intermediate strips, FIG. 7b to another connection with the mask for the intermediate strips, FIG. 8a to a connection with the mask for phosphor strips, FIG. 8b to another connection with the mask for phosphor strips, FIG. 9a to a connection with the mask for the index strips and FIG. 9b to another connection with the mask for the index strips.

FIG. 3 shows a part 75 of a curved glass plate which occupies the same accurate position relative to the radiation source (not shown), the auxiliary mask 2 and the lens system 3, as the glass plate 1 of FIG. 1 and the glass plate 65 of FIG. 2, while the surface area facing the lens is also substantially the same. The side of the glass plate 75 facing the lens is provided with a photosensitive layer which is exposed according to the setup shown in FIG. 3. Again, for the sake of simplicity, only the picture formed of the photosensitive layer is shown, consisting of the portions 76, 77 and 78. An additional auxiliary mask 7 is placed at the side of the auxiliary mask 2 facing the radiation source (not shown). The additional auxiliary mask 7 comprises a glass plate 70 having thereon substantially striplike surfaces 71, 72, 73 and 74 which are impervious to the radiation. The surface 71 ensures that the radiation cannot reach the pervious portion 12 of the auxiliary mask 2; the same applies to the surface 72 relative to the portions 16 and 18, to the surface 73 relative to the portions 22 and 24, and to the surface 74 relative to the portions 28 and 30. On the other hand the additional auxiliary mask 7 allows the radiation which is directed to the pervious portions 14, 20 and 26 of the auixilary mask 2 to pass unhampered. During the reproduction which takes place with the setup of FIG. 3 the portions 14 20 and 26 pervious to radiation serve as the object. The setup is otherwise identical with that of FIG. 2. The additional auxiliary mask 7 may be a separate auxiliary mask, but it is also possible to use the additional auxiliary mask 6 for this purpose and to shift it over the relevant distance, in the described case 74 microns, for the setup of FIG. 3. In the resulting negative 79 for the strips of the second phosphorus the portions 76, 77 and 78 are impervious to the radiation which is used later on in the manufacture of the relevant mask with the aid of the said negative. The portions 76, 77 and 78 each have a width slightly less than 200 microns in the middle of the negative.

Subsequently a negative for the strips of the third phosphor is manufactured in an analogous manner the pervious portions 12, 18, 24 and 30 of the auxiliary mask 2 then being reproduced.

Figure 4:
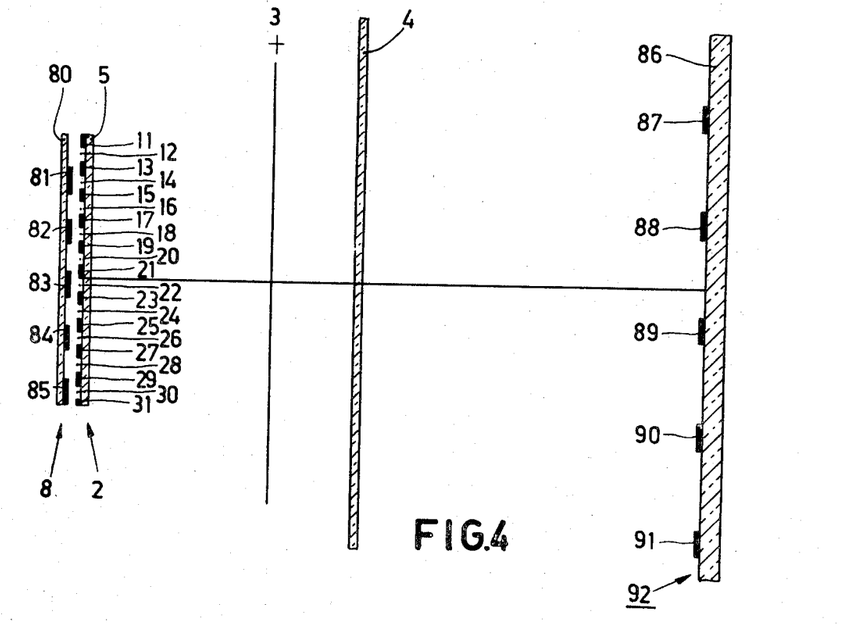

FIG. 4 shows a part 86 of a curved glass plate which occupies the same accurate position relative to the radiation source (not shown), the auxiliary mask 2 and the lens system 3 as the glass plate 1 of FIG. 1, the glass plate 65 of FIG. 2 and the glass plate 75 of FIG. 3, while the surface area facing the lens is also substantially the same. The side of the glass plate 86 facing the lens is provided with a photosensitive layer which is exposed according to the setup of FIG. 4. Again, for the sake of simplicity, only the picture formed of the photosensitive layer is shown, consisting of the portions 87, 88, 89, 90 and 91. An additional auxiliary mask 8 is placed at the side of the auxiliary mask 2 facing the radiation source (not shown). The additional auxiliray mask 8 comprises a glass plate 80 having thereon substantially striplike surfaces 81, 82, 83, 84 and 85 which are impervious to the radiation. The surface 81 ensures that the radiation cannot reach the portion 14 of the auxiliary mask 2 pervious to radiation; the same applies to the surface 82 relative to the portion 18, to the surface 83 relative to the portion 22, to the surface 84 relative to the portion 26, and to the surface 85 relative to the portion 30. On the other hand, the additional auxiliary mask 8 allows the radiation which is directed to the pervious portions 12, 16, 20, 24 and 28 of the auxiliary mask 2 to pass unhampered. During the reproduction which takes place with the setup shown in FIG. 4 the portions 12, 16, 20, 24 and 28 pervious to radiation serve as the object. The planoparallel plate 4 is again placed parallel to the auxiliary mask 2 exactly as in the set up of FIG. 1. In the resulting negative 92 for the index strips the portions 87, 88, 89, 90 and 91 are impervious to the radiation which is used later on in the manufacture of the relevant mask with the aid of the said negative. The portions 87, 88, 89, 90 and 91 each have a width slightly less than 200 microns in the middle of the negative. When comparing the negative 92 for the index strips and the negative 9 for the intermediate strips it is found that the portions 87, 88, 89, 90 and 91 occupy the positions of part of the portions 41, 42, 43, 44, 45, 46, 47, 48, 49 and 50.

Figure 5:
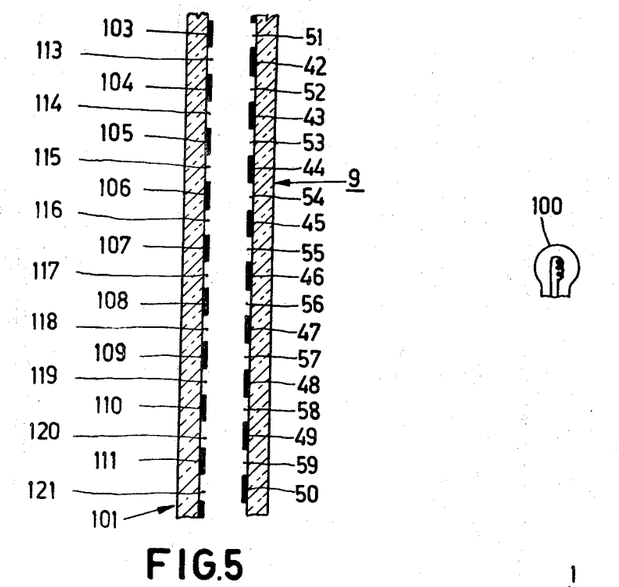

At least one mask is manufactured of each curved negative obtained in this manner, using a photosensitive layer. This is shown in FIG. 5 for the negative 9 for the intermediate strips. This figure shows a part of a curved negative 9, a radiation source 100 and a part of the curved glass plate 102 which is exposed through the negative. The negative 9 and the glass plate 102 are arranged accurately to each other. The surface of the glass plate 102 facing the negative 9 substantially corresponds to the surface of the glass plate 1 of the negative 9 situated on that side. The side of the glass plate 102 facing the negative is provided with a photosensitive layer which is exposed according to the setup shown in FIG. 5. In this case also for the sake of simplicity, only the picture formed of the photosensitive layer is shown consisting of the portions 103, 104, 105, 106, 107, 108, 109, 110 and 111, which portions are struck by radiation from the radiation source 100 which passes through the pervious portions 51, 52, 53, 54, 55, 56, 57, 58 and 59 of the negative 9. Said portions pervious to radiation each have a width slightly more than 200 microns in the middle of the negative, whereas the impervious portions 41, 42, 43, 44, 45, 46, 47, 48, 49 and 50 each have a width slightly less than 200 microns in the middle of the negative. As a result, the covered portions 103, 104, 105, 106, 107, 108, 109, 110 and 111 of the mask 101 have a width slightly more than 200 microns in the middle of the mask, whereas the uncovered portions 112, 113, 114, 115, 116, 117, 118, 119, 120 and 121 have a width slightly less than 200 microns in the middle of the mask.

The mask 101 is used for applying the intermediate strips in the display screens. The surface of the curved glass plate 102 is provided with the portions impervious to radiation substantially corresponds to one of the surfaces of the curved glass plate 1 of the negative 9, which surface in itself substantially corresponds to the to the surface of the window of the cathode-ray tube on which the display screen is applied so that the surfaces of the mask and the window also substantially correspond to each other. This is also true of the other masks. During its manufacture each negative has occupied the same accurate position relative to the radiation source, the auxiliary mask and the lens system. Also in the manufacture of the masks, starting from each negative, steps are taken for an accurate mutual position so that the manufactured masks are relatively matched. This can be achieved by giving the glass plate on which the mask is manufactured a fixed position on the frame while the negative also occupies a fixed position on the same frame. If during the manufacture of the display screens the window occupies the same position relative to the mask in each exposure setup, it is achieved that the display screen acquires the desired structure. To this end, the window, for example, occupies the fixed position of the negative on the said frame.

Figure 6:
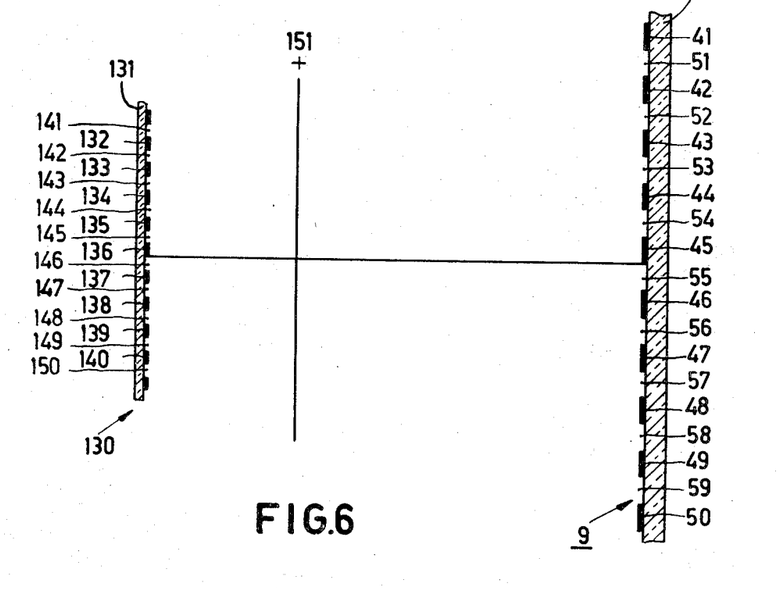

Unlike the setup of FIG. 5 it is possible to use an exposure setup for the manufacture of the masks in which an image of the illuminated negative is reproduced on the layer to be exposed with the aid of a lens system. This setup, which is shown in FIG. 6, comprises a part of the curved negative 9 which is exposed to a radiation source (not shown) and a lens system 151 (shown diagrammatically) with the aid of which the illuminated negative is reproduced on a partly shown glass plate 131. The radiation source (not shown), the negative 9, the lens system 151 and the glass plate 131 are arranged accurately relative to one another. The side of the glass plate 131 facing the lens is provided with a photosensitive layer which is exposed according to the setup shown in FIG. 6. Again, for the sake of simplicity, only the picture formed of the photosensitive layer is shown, consisting of the portions 132, 133, 134, 135, 136, 137, 138, 139 and 140, which portions are struck by the radiation which passes through the pervious portions 59, 58, 57, 56, 55, 54, 53, 52 and 51 of the negative 9. Said portions pervious to radiation each have a width slightly more than 200 microns in the middle of the negative whereas the impervious potrions 41, 42, 43, 44, 45, 46, 47, 48, 49 and 50 each have a width slightly less than 200 microns in the 132, 133, 134, 135, 136, 137, 138, 139 and 140 of the mask 130 are slightly wider than a certain measure in the middle of the mask whereas the uncovered portions 141, 142, 143, 144, 145, 146, 147, 148, 149 and 150 are slightly narrower than that certain measure in the middle of the mask. How large that certain measure is depends on the demagnification of the lens system 151. Starting from the other negatives, the other masks are manufactured in the same manner but in each case in another analogous setup. In the manufacture of the display screens the illuminated mask is reproduced in each exposure setup on the layer to be exposed on the window with the aid of the lens system used for the manufacture of the relevant mask. The negative 9 is curved so that, if the mask 130 is flat, the lens system 151 must preferably satisfy special requirements in connection herewith. If the mask 130 is curved in accordance with the negative 9 there are no special requirements with regard to the lens system.

The case described above, in which reproduction with the aid of a lens system takes place, in each step permits of a variant and this with regard to the planoparallel plate. In the case described, the planoparallel glass plate was present during the manufacture of the negatives. In the alternative case the said plate is omitted in the exposure setup for the manufacture of the negatives, but it is always present in the various exposure setups during the manufacture of the masks starting from the negatives and also during the manufacture of the display screen with the aid of the different masks. With regard to the positions of the planoparallel plates there are still two possibilities. In the one case the plates occupy the same position in the manufacture of all masks, which position is also occupied by the plates in the manufacture of the display screen as the intermediate strips and the index strips are applied, whereas the plates in the exposure setups for the application of the phosphor strips are turned relative thereto through an angle of 3°10′. In the other case the plates occupy a certain position in the manufacture of the masks for the intermediate strips and the index strips and their position is turned through an angle of 3°10′ in the manufacture of the masks for the phosphor strips, while the plates in the exposure setups for the application of the components of the screen occupy the same position as that of the plates during the manufacture of the masks for the intermediate strips and the index strips.

In the description of the method with the aid of the FIGS. 1 up to and including 6 a negative procedure is always used in which the exposed portions are impervious to radiation. For example, in FIG. 1, the pervious portion 22 of the auxiliary mask 2 is reproduced at the area of the portion 45 of the photosensitive layer on the glass plate 1 with the aid of the lens system 3.

FIGS. 7a and 7b, 8a and 8b, 9a and 9b show diagrammatically how the desired matching of the masks can be obtained by using positive and negative procedures. These figures show the impervious portions of the auxiliary mask, the additional auxiliary masks, the negatives and the masks. For the sake of clarity a magnification of 1 has been assumed.

Figure 7A:
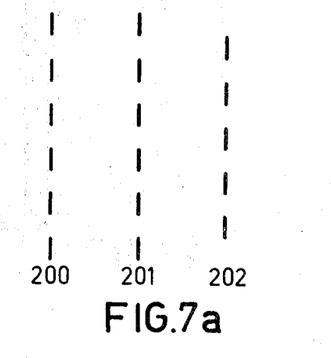
Figure 7B:
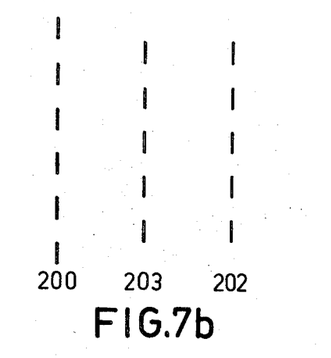

FIGS. 7a and 7b relate to the manufacture of the mask for the intermediate strips. According to FIG. 7a a negative 201 is manufactured of an auxiliary mask 200 with the aid of a positive procedure and of this negative a ask 202 is manufactured with the aid of a negative procedure. According to FIG. 7b a negative 203 is manufactured of the auxiliary mask 200 with the aid of a negative procedure and of this negative the mask 202 is manufactured with the aid of a positive procedure. The pervious portions of the mask 202 correspond to the impervious portions of the auxiliary mask 200.

Figure 8A:
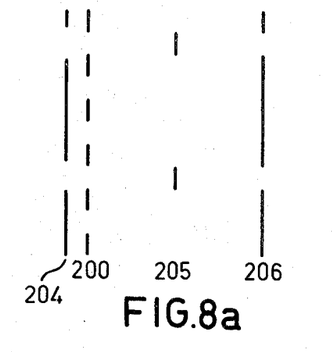
Figure 8B:
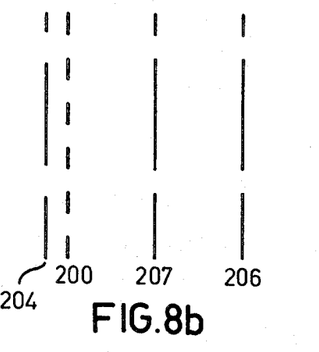

FIGS. 8a and 8b relate to the manufacture of a mask for the luminescent strips. According to FIG. 8a a negative 205 is manufactured with the aid of a negative procedure of the auxiliary mask 200 which is covered with an additional auxiliary mask 204, and of this negative a mask 206 is manufactured with the aid of a negative procedure. According to FIG. 8b a negative 207 is manufactured with the aid of a positive procedure of the auxiliary mask 200 which is covered with the additional auxiliary mask 204 and of this negative the mask 206 is manufactured with the aid of a positive procedure. The pervious portions of the mask 206 correspond to pervious portions of the auxiliary mask 200.

Figure 9A:
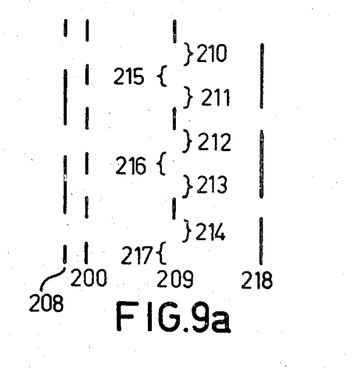
Figure 9B:
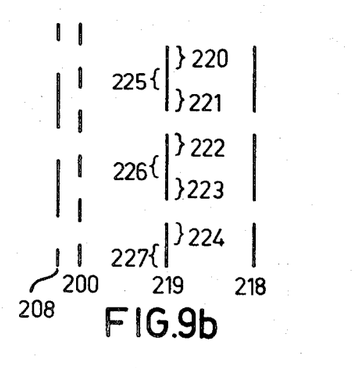

FIGS. 9a and 9b relate to the manufacture of a mask for the index strips. According to FIGURE 9a a negative 209 is manufactured with the aid of a positive procedure of the auxiliary mask 200, exposure having taken place twice. The first time the auxiliary mask 200 was not covered and the portions 210, 211, 212, 213 and 214 were exposed. The second time the auxiliary mask 200 was covered with an additional auxiliary mask 208, while between the auxiliary mask 200 and the negative 209 a planoparallel glass plate (not shown) was placed which produced such an optical shift that the portions 215, 216 and 217 were exposed. A mask 218 has been manufactured of the negative 209 with the aid of a negative procedure. According to FIG. 9b a negative 219 is manufactured with the aid of a negative procedure of the auxiliary mask 200, exposure having taken place twice. The first time the auxiliary mask 200 was not covered and the portions 220, 221, 222, 223 and 224 were exposed. The second time the auxiliary mask 200 was covered with the additional auxiliary mask 208, while between the auxiliary mask 200 and the negative 219 a planoparallel glass plate (not shown) was placed which produced such an optical shift

What is claimed is:

1. A method of manufacturing a plurality of relatively matched masks each consisting of a glass carrier provided with portions impervious to radiation, which masks are used in the manufacture of a display screen for a cathode-ray tube for color display, said screen comprising at least two substances present in substantially striplike surfaces, which become luminescent in different colors upon excitation by electrons and are separated by substantially striplike surfaces of a substance which does not become luminescent in visible light upon electron excitation and is impervious to light, and substantially striplike surfaces of a substance which porduces an index signal upon electron excitation, comprising the steps of forming a negative consisting of a transparent carrier provided with portions impervious to radiation for each mask by first developing a photosensitive layer exposed to radiation passing radiation through selected areas of the auxiliary impervious portions so that desired surfaces of the negative for the mask relating to the substantially striplike surfaces of the subtance which does not become luminescent in visible light upon electron excitation and is impervious to light are exposed to said radiation, thereafter passing radiation through selected areas of the auxiliary mask, partly covered in the cases of the negatives for the masks relating to substantially striplike surfaces of the substances which become luminescent in different colors upon electron excitation in interspaces between the surfaces of the substance which produces an index signal upon electron excitation, said selected areas being displaced for each of said striplike surfaces in an amount necessary to position said substantially striplike surfaces of the substances which become luminecent in different colors upon electron excitation in interspaces between the substantially striplike surfaces of the substance which does not become luminescent in visible light upon electron excitation and is impervious to light, and thereafter forming a mask of each negative by exposing and developing an exposed photosensitive layer on a glass base through each said negative.

2. A method as claimed in claim 1 further including the steps of passing the radiation through a planoparallel plate which is positioned in front of and parallel to the negative for the mask relating to the substantially striplike surfaces of the substance which does not become luminescent in visible light upon electron excitation and is impervious to light and rotating the planoparallel plate through a small angle about an axis parallel to the line pervious to radiation in the middle of the auxiliary mask in front of the negatives for the masks relating to the substantially striplike surfaces of the substances which become luminescent in different colors upon electron excitation, and positioning the planoparallel plate in front of and parallel to the negative for the mask relating to the substantially striplike surfaces of the substance which produces an index signal upon electron excitation.

3. A method as claimed in claim 1 wherein the negatives relating to the substantially striplike surfaces of the substance which does not become luminescent in visible light upon electron excitation and is impervious to light and those relating to striplike surfaces which become luminescent in different colors upon electron excitation, each of which produces masks having light pervious portions corresponding to light impervious and pervious portions respectively of the auxiliary mask, and the negative relating to the substantially striplike surfaces of the substance which produces an index signal upon electron excitation is formed by first exposing a photosensitive layer to radiation passing only through auxiliary mask and thereafter exposing said negative a second time to radiation passing through auxiliary mask partly covered whereby said negative has unexposed portions that correspond to part of the impervious portion of the auxiliary mask and results in masks having light pervious portions corresponding to the unexposed portions of the negative.

References Cited
UNITED STATES PATENTS

| | | | |
|---|---|---|---|
| 2,870,010 | 1/1959 | Sadowsky et al. | 96—36.1 |
| 2,963,947 | 12/1960 | Freer et al. | 95—4.5 |
| 3,451,812 | 6/1969 | Tamura | 96—36.1 |

OTHER REFERENCES

Denstman: "Shooting Combos," January 1965, in-plant printer, pp. 32–34, 46.

GEORGE F. LESMES, Primary Examiner

R. E. MARTIN, Assistant Examiner